(12) United States Patent
Simpson et al.

(10) Patent No.: US 7,642,753 B2
(45) Date of Patent: Jan. 5, 2010

(54) APPARATUS AND SWITCHING METHOD FOR IMPROVING CYCLE-LIFE AND CAPACITY OF A BATTERY PACK

(75) Inventors: Russell L. Simpson, Miami, FL (US); Joseph Patino, Pembroke Pines, FL (US)

(73) Assignee: Motorola, Inc., Schaumburg, IL (US)

( * ) Notice: Subject to any disclaimer, the term of this patent is extended or adjusted under 35 U.S.C. 154(b) by 331 days.

(21) Appl. No.: 11/228,550

(22) Filed: Sep. 16, 2005

(65) Prior Publication Data

US 2007/0063671 A1    Mar. 22, 2007

(51) Int. Cl.
*H02J 7/04*    (2006.01)
*H02J 7/00*    (2006.01)
(52) U.S. Cl. .............................. 320/162; 320/132
(58) Field of Classification Search ............... 320/110, 320/116, 119, 122, 132, 162
See application file for complete search history.

(56) References Cited

U.S. PATENT DOCUMENTS

| | | | | |
|---|---|---|---|---|
| 4,275,739 | A * | 6/1981 | Fischell | 607/9 |
| 5,422,558 | A * | 6/1995 | Stewart | 320/120 |
| 5,641,587 | A * | 6/1997 | Mitchell et al. | 429/90 |
| 5,686,815 | A * | 11/1997 | Reipur et al. | 320/116 |
| 5,695,886 | A * | 12/1997 | Dewan et al. | 429/7 |
| 5,864,220 | A * | 1/1999 | Reipur et al. | 320/134 |
| 6,140,928 | A * | 10/2000 | Shibuya et al. | 340/636.13 |
| 6,265,846 | B1 * | 7/2001 | Flechsig et al. | 320/116 |
| 6,504,344 | B1 * | 1/2003 | Adams et al. | 320/132 |
| 2003/0038611 | A1 | 2/2003 | Morgan | |
| 2005/0029986 | A1 | 2/2005 | Morgan | |

FOREIGN PATENT DOCUMENTS

| | | | |
|---|---|---|---|
| GB | 2 360 148 | A | 9/2001 |
| GB | 2 362 519 | A | 11/2001 |

* cited by examiner

*Primary Examiner*—Jessica Han
*Assistant Examiner*—Emily Pham
(74) *Attorney, Agent, or Firm*—Akerman Senterfitt; Sylvia Chen

(57) ABSTRACT

A charging system (108) supplies a source voltage (Vco, FIG. 5) and a source current (Ico, FIG. 5) to a plurality of battery cells (110). The charging system operates according to a method (200) including the steps of determining (202) a capacity for each of the plurality of battery cells (120 and 130), determining (204) a desired cutoff current (Ico1, FIG. 5) for a select one of the plurality of battery cells (120) having the smallest capacity, determining (206) an optimal source cutoff current according to the capacity of the select one of the plurality of battery cells, adjusting (208) the source current according to the optimal source cutoff current, and upon the source current reaching the optimal source cutoff current, switching out the select one of the plurality of battery cells to allow continued charging of another cell until it is fully charged.

11 Claims, 6 Drawing Sheets

100

$Ico_1 = Ic1 + Ic2$

Given $C1 = 500$ mAH, $C2 = 1000$ MAH, $Ic1 = 50$ mA $$= \frac{C1 * Ico}{C\ total} + \frac{C2 * Ico}{C\ total}$$

$Ico_1 = (1500/500) * 50$ mA $= 150$ mA
$Ic1 = (500/1500) * 150$ mA $= 50$ mA
$Ic2 = (1000/1500) * 150$ mA $= 100$ mA

APPARATUS AND SWITCHING METHOD FOR IMPROVING CYCLE-LIFE AND CAPACITY OF A BATTERY PACK

FIELD OF THE INVENTION

This invention relates generally to battery charging systems, and more particularly to a switching scheme for improving cycle-life and capacity of a battery pack.

BACKGROUND OF THE INVENTION

FIG. 1 is an illustration of a prior art system for charging conventional battery cells (depicted as CELL 1 and CELL 2). In this prior art system, two cells (CELL 1 and CELL 2) are charged by way of a source current (Ico) supplied by a conventional charging system (not shown). Prior art systems generally select the source current Ico according to the cutoff current of one of the cells. The reader's attention is directed to FIG. 2, which provides a diagram depicting the relationship of cycle-life (i.e., the number of functional charge and discharge cycles of a conventional battery cell) and the charging capacity of said cell as a function of source voltage and cutoff current. From this illustration, the cutoff current of a cell is typically 40 mA to 50 mA and 4.2 volts.

Prior art systems such as shown in FIG. 1 set the source current Ico to cutoff current shown in FIG. 2. From the illustration of FIG. 1, CELL 1 and CELL2 have asymmetric capacities of 500 mAh (milli-Ampere hours) and 1000 mAH, respectively. The cutoff current at each cell can be determined from a product of the source current Ico and the ratio of the capacity of the cell in question to the total capacity of the cells. Accordingly, the cutoff current of CELL 1 (Ic1) is 13.3 mA, while the cutoff current of CELL 2 (Ic2) is 26.7 mA.

Referring back to FIG. 2, four curves are shown (10, 12A-B, and 14) at a variety of source voltages and cutoff currents. Starting with curve 10, a source voltage of 4.3V at a cutoff current of 40 mA provides a higher capacity charge (950 mAh), but a shorter cycle-life (500 cycles) than curves 12 and 14. Curve 12A provides a charge capacity of 875 mAh and a cycle-life of 750 cycles at a lower source voltage (4.2V), but the same cutoff current (40 mA). Thus, the lower source voltage (4.2V) provides a longer cycle-life, but a lower charge capacity. Curve 14 provides a charge capacity of 790 mAh and a cycle-life of greater than 1000 cycles at a source voltage of 4.1V and cutoff current of 40 mA.

From these curves 10-14 it should be apparent that varying the source voltage results in an inverse relationship between charge capacity and cycle-life. It is also important to note that when the cutoff current is significantly reduced, the cycle-life of the battery cell is significantly impacted. Curve 12B shows that when the cutoff current is reduced by half (20 mA) the cell's cycle-life is impacted by 20% (i.e., a cycle-life of 600 cycles—a reduction of 150 cycles from curve 12A). This latter effect has an undesirable impact on the cycle-life of parallel cells of the prior art system of FIG. 1.

SUMMARY OF THE INVENTION

Embodiments in accordance with the invention provide a method and apparatus for improving cycle-life and capacity of a battery pack, particularly a battery pack having at least a smaller capacity cell and a larger capacity cell coupled in a parallel fashion. Although further adjusting the cutoff current of the smaller or smallest cell in the battery pack can improve the cycle life and capacity of the smaller cell and even the cycle life of the larger cell, such techniques alone will not improve the capacity of the larger cell (and of the battery pack overall). Embodiments herein enable both cells to be fully charged while maintaining each cells' optimum current cutoff point, thereby preserving cycle life performance.

In a first embodiment of the present invention, a device can include a plurality of battery cells selectively coupled in parallel, at least one switch responsive to a control signal for selectively decoupling at least a select cell among the plurality of battery cells, and a charging system for supplying a source voltage and a source current to the plurality of battery cells. The charging system can be programmed to determine a capacity for each of the plurality of battery cells, determine a desired cutoff current for a select one of the plurality of battery cells having the smallest capacity, determine an optimal source cutoff current according to the capacity of the select one of the plurality of battery cells, and adjust the source current according to the optimal source cutoff current. The charging system can be further programmed to provide the control signal to control the operation of the at least one switch upon the source current reaching the optimal source cutoff current.

In a second embodiment of the present invention, a battery pack having a plurality of battery cells that works in conjunction with a charging system that supplies a source voltage and a source current and determines a capacity for each of the plurality of battery cells, a desired cutoff current for a select one of the plurality of battery cells having the smallest capacity, and an optimal source cutoff current according to the capacity of the select one of the plurality of battery cells is disclosed. The battery pack can include the plurality of battery cells selectively coupled in parallel and at least one switch responsive to a control signal for selectively decoupling at least the select one among the plurality of battery cells. Note, the plurality of battery cells receive an adjusted source current based on the optimal source cutoff current and the at least one switch is controlled to selectively decouple upon the source current reaching the optimal source cutoff current.

In a third embodiment of the present invention, a charging system supplies a source voltage and a source current to a plurality of battery cells. The charging system can operate according to a method including the steps of determining a capacity for each of the plurality of battery cells, determining a desired cutoff current for a select one of the plurality of battery cells having the smallest capacity, determining an optimal source cutoff current according to the capacity of the select one of the plurality of battery cells, adjusting the source current according to the optimal source cutoff current, and upon the source current reaching the optimal source cutoff current, disconnecting at least the select one of the plurality of battery cells while continuing to apply the source current to a remaining set of cells among the plurality of cells. Note, the plurality of battery cells can correspond to a plurality of parallel battery cells.

DETAILED DESCRIPTION

Figure 1:
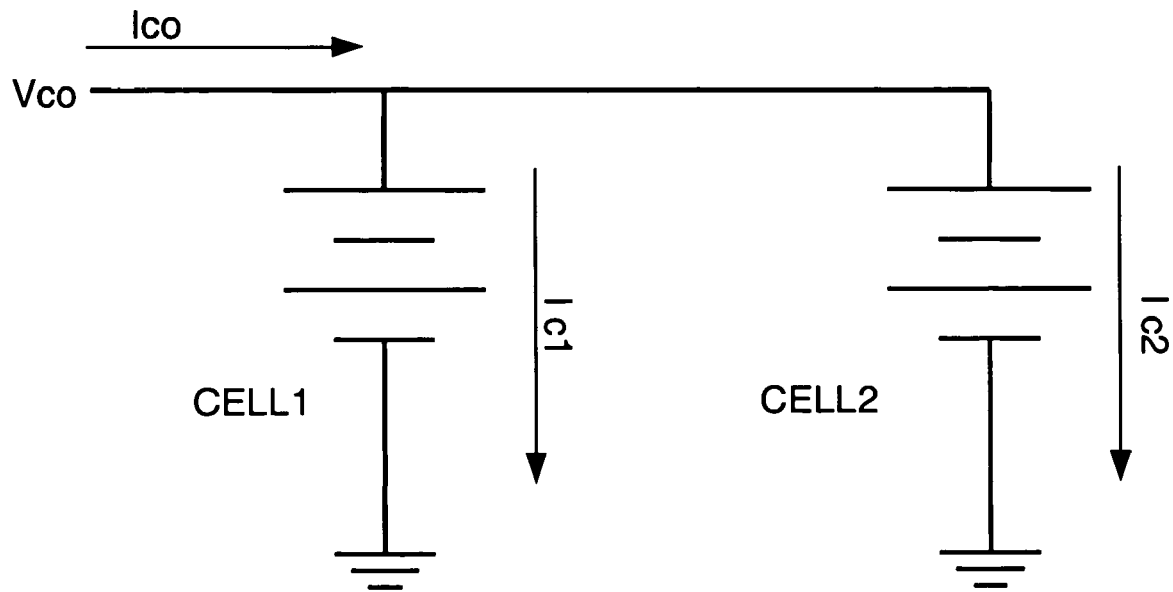
FIG. 1 is an illustration of a prior art system for charging battery cells.
Figure 2:
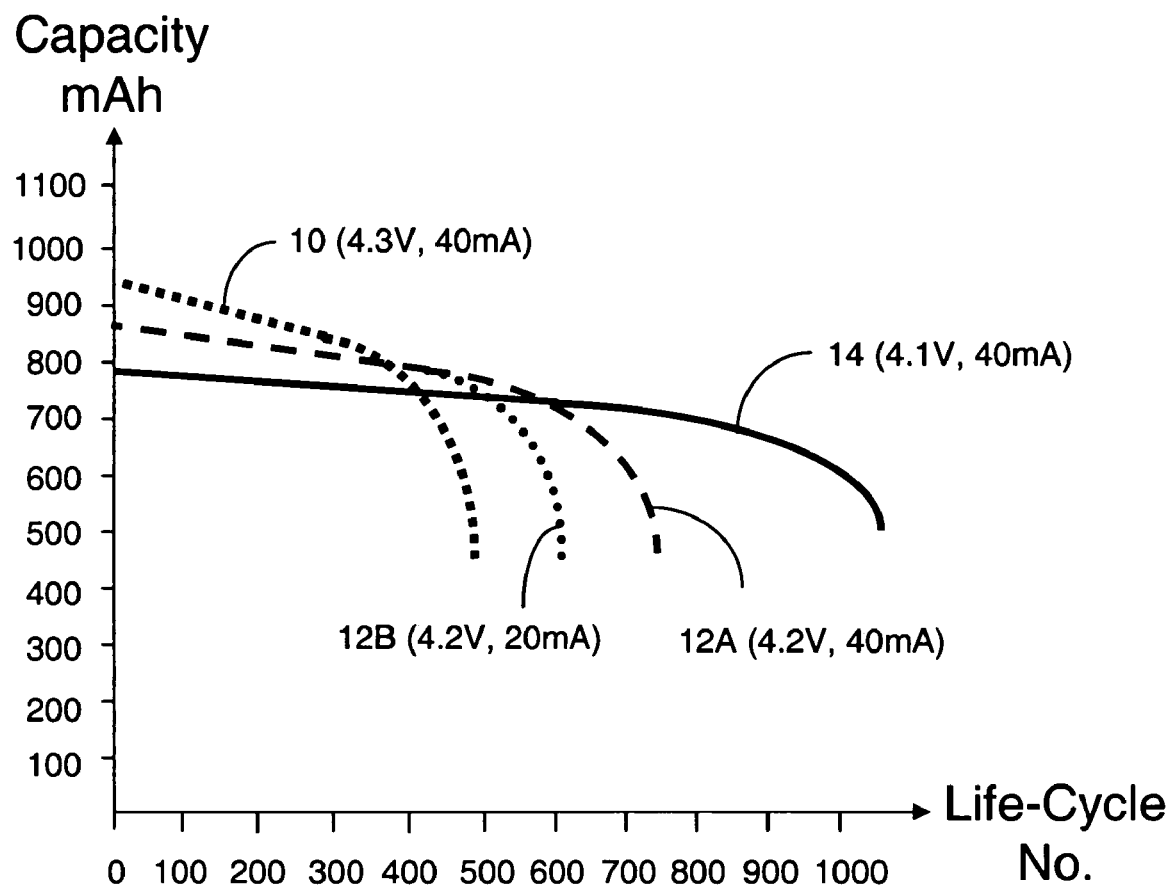
FIG. 2 is a diagram depicting the relationship of cycle-life and charging state of battery cells according to source voltage and cutoff current.

While the specification concludes with claims defining the features of embodiments of the invention that are regarded as novel, it is believed that the embodiments of the invention will be better understood from a consideration of the following description in conjunction with the figures, in which like reference numerals are carried forward.

Figure 3:
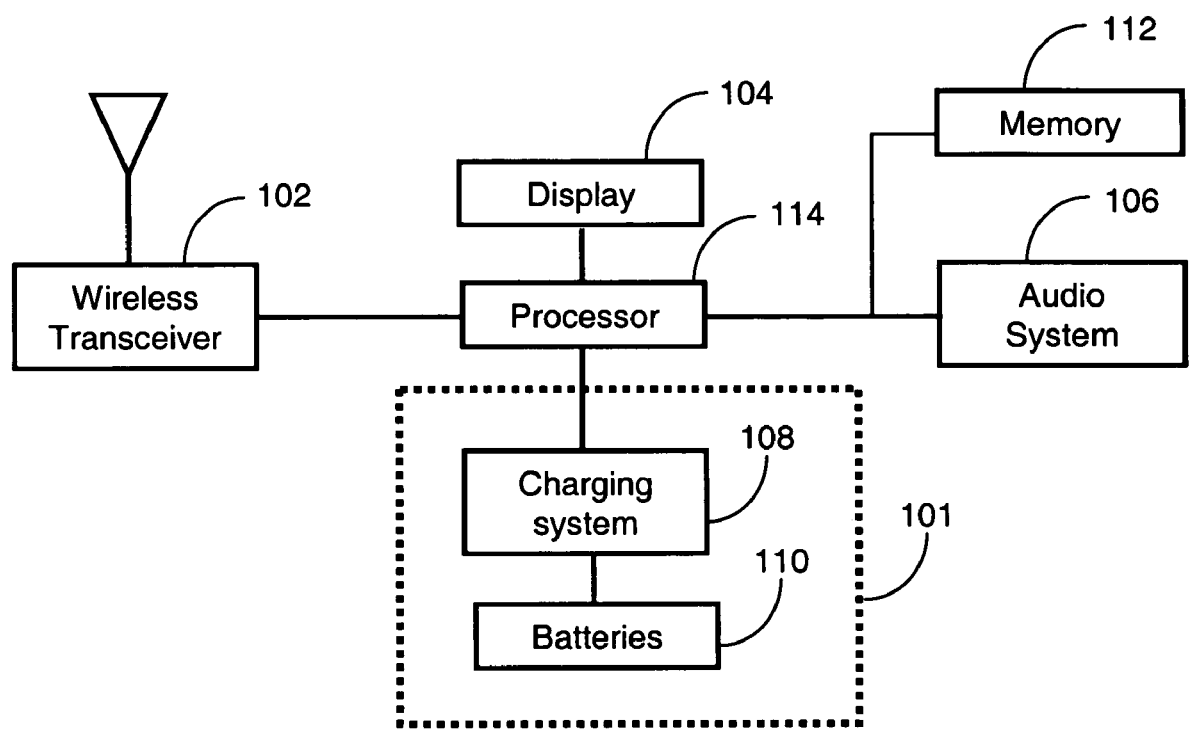
FIG. 3 is a block diagram of a device in accordance with an embodiment of the present invention.
Figure 5:
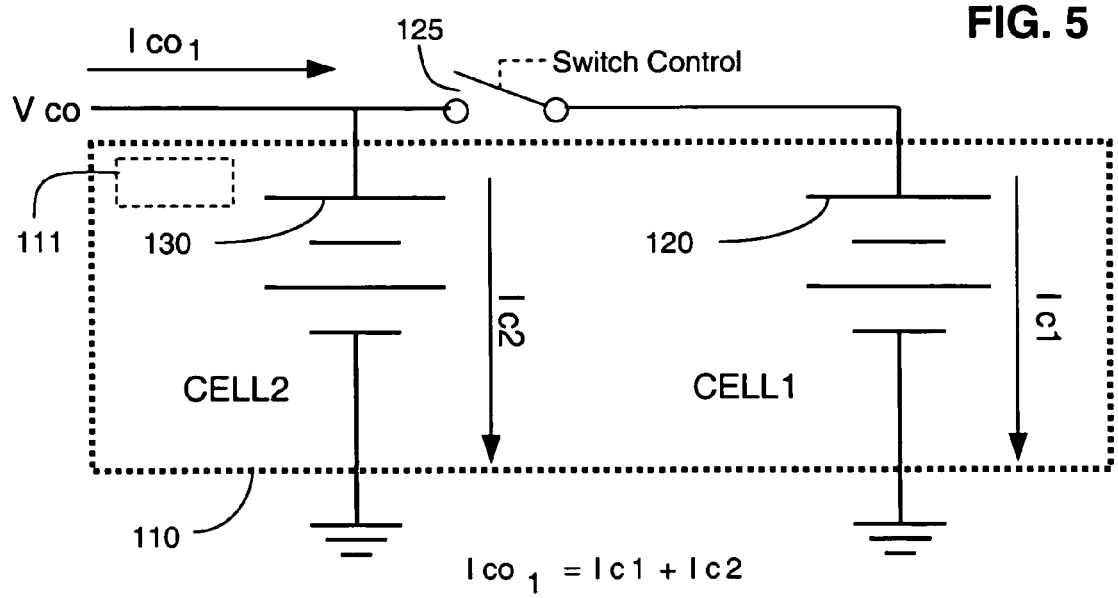
FIG. 5 is circuit diagram of a battery pack in accordance with an embodiment of the present invention.
Figure 6:
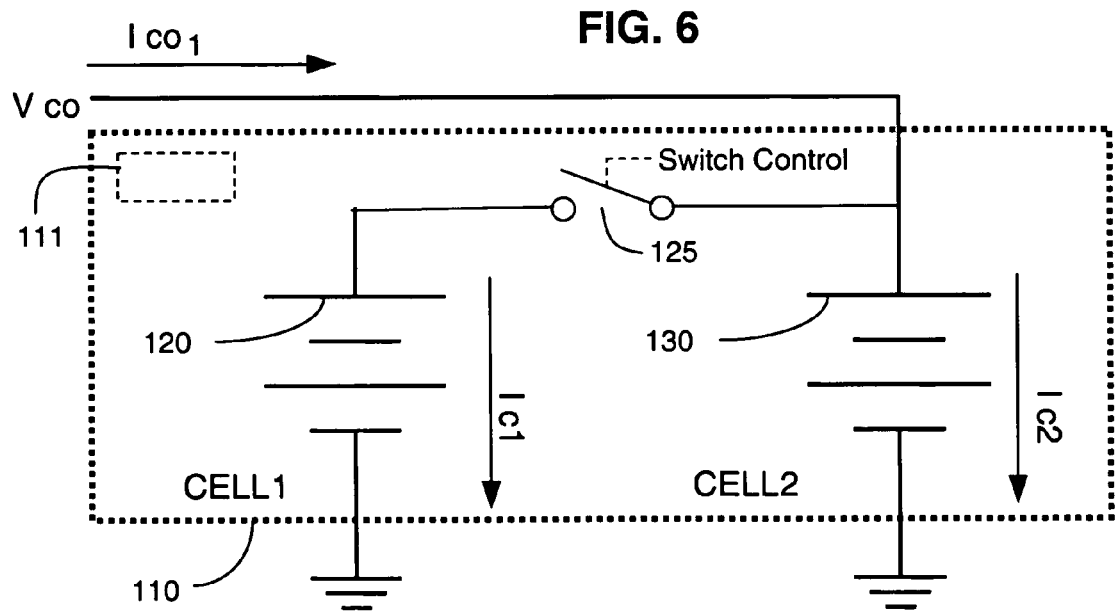
FIG. 6 is circuit diagram of a battery pack in accordance with an alternative embodiment of the present invention.
Figure 7:
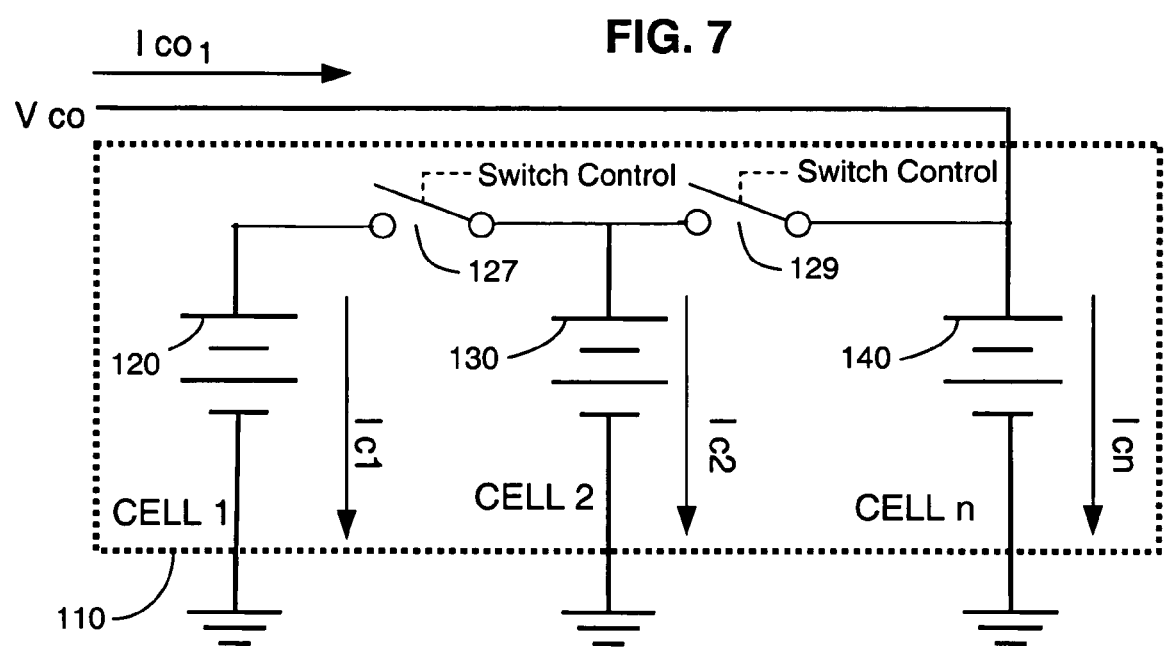
FIG. 7 is circuit diagram of a battery pack in accordance with yet another alternative embodiment of the present invention.

FIG. 3 is a block diagram of a device 101 in accordance with an embodiment of the present invention which can reside within a selective call receiver (SCR) 100 as will be further detailed below. The device 101 comprises a plurality of conventional battery cells 110 and a charging system 108. The charging system 108 includes, for example, a conventional regulation circuit (not shown) with conventional charge pumps if needed. The charging system 108 is coupled to the cells 110 for supplying an adjustable source voltage and source current for charging said cells 110. The battery cells 110 can be interconnected as shown in FIG. 5, 6 or 7 and can be carried in a conventional battery pack. The battery cells 110 can be coupled in parallel to form the battery pack and each of the cells in the battery pack can have different capacities and be charged in accordance with a method 200 as shown in FIG. 4.

Figure 4:
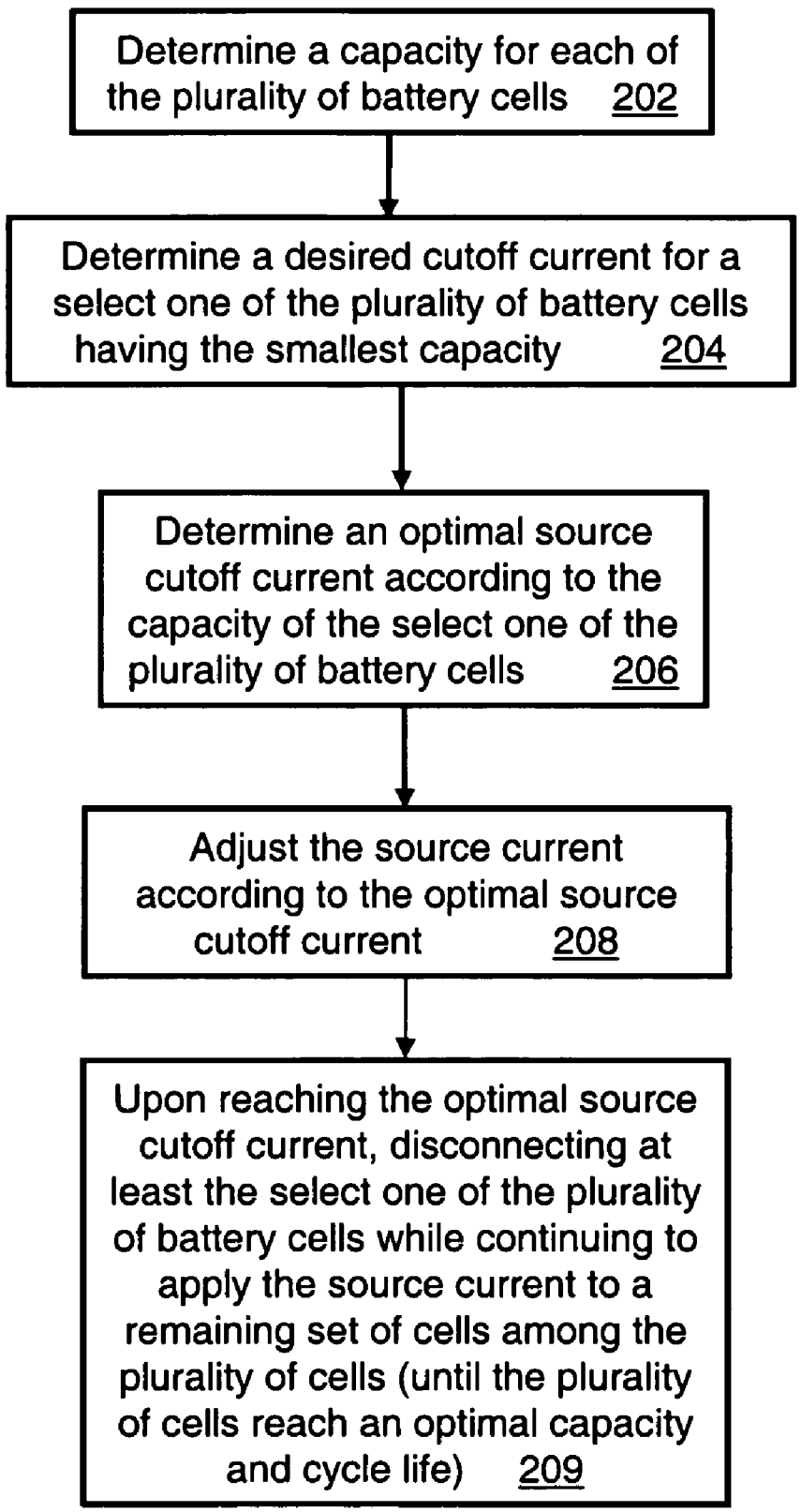
FIG. 4 is a flow chart depicting a method operating in the device in accordance with an embodiment of the present invention.

FIG. 4 is a flow chart depicting the method 200 operating, for example, in the device 101 in accordance with an embodiment of the present invention. The method 200 begins with step 202 where the charging system 108 is programmed to determine a capacity for each of the cells 120 and 130 among the plurality of cells 110 (See FIG. 5). In step 204, a desired cutoff current is determined for a select one of the battery cells 120 having the smallest capacity. In step 206, an optimal source cutoff current is determined according to the capacity of the select one of the cells 120 (among the plurality of cells 110). In step 208, the source current is adjusted according to the optimal source cutoff current determined in step 206. Upon reaching the optimal source cutoff current, the method 200 can then disconnect at least the select one (120) of the plurality of battery cells while continuing to apply the source current to a remaining set of cells (130 and/or 140 in FIG. 7) among the plurality of cells at step 209. Instead of cutting off or stopping all charging to the plurality of cells 120 and 130 when the source current reaches the optimum source cutoff current, a switch 125 can be opened to enable cell 130 to continue charging until it reaches its optimum current cutoff point since cell 120 is already fully charged. Subsequently, switch 125 can then be closed. In this manner, both cells 120 and 130 are fully charged without exceeding their respective current cutoff thresholds to assure optimal capacity while preserving the optimal cycle life performance In other words, when the optimal source cutoff current is reached, instead of terminating the charge, the algorithm switches out the first cell and just charges the second cell until its cutoff threshold is reached. After the initial charge cycle when the switch 125 is initially closed then opened (and the charge to cell 130 is terminated), the switch 125 can once again be closed (either immediately or after a predetermined time). Using these techniques, both cells (120 and 130) are fully charged without exceeding their respective current cutoff thresholds to assure optimal capacity and cycle life performance. Another way of viewing several of the embodiments herein is that the methods and systems disclosed assure optimal cycle life while enabling the "topping off" of cells at the end of their recharge cycles to provide optimum capacity for all cells in a plurality of parallel cells.

FIG. 5 is circuit diagram that illustrates the operation of the charging system 108 in accordance with method 200 of FIG. 4. The plurality of cells 110 are depicted as two parallel battery cells 120 and 130 (CELL 1 and CELL 2) with a switch 125 between them. Like the prior art system of FIG. 1, the capacity of these cells is 500 mAh and 1000 mAh, respectively, each having an ideal cutoff current in this example of 50 mA (or higher). In a supplemental embodiment of the invention, the capacity of each cell 120 and 130 and other relevant characteristics can be supplied to the charging system 108 by the cells 120 and/or 130 in step 202. That is, one or both cells (120 and/or 130) can include intelligent circuitry 111 such as a small conventional memory that can be programmed to supply the characteristics of one or both cells (120 and/or 130). Such characteristics can include one or more cutoff currents with its corresponding expected cycle-life performance for each current, and one or more source voltages and corresponding charge capacity for each voltage. This in turn provides flexibility to select a source voltage (Vco) and a source current (Ico) that optimizes cycle-life and charge capacity for the cells 110. Note, the circuit diagram of FIG. 6 is essentially the same as the circuit diagram of FIG. 5, with the exception that the switch 125 is within the battery pack 110 in the embodiment of FIG. 6 whereas the switch 125 is not necessarily within the battery pack in the embodiment of FIG. 5.

From this step, a designer of the charging system 108 can choose to balance the need for charge capacity and cycle-life of battery cells 110 or possibly implement an algorithm that can provide optimum charge capacity and cycle-life characteristics for all the battery cells 120 and 130 under certain circumstances. In determining this balancing effect, the designer considers the expected use behavior of the device 101, and determines therefrom a source voltage (Vco) and a cutoff current (Ic1) of the smallest capacity cell 120 (CELL 1). In the present example, the designer is assumed to choose the source voltage (Vco) at 4.2V in order to achieve a first predetermined charge capacity. Similarly, the designer is assumed to choose a cutoff current (Ico1) of the smallest cell 120 at 50 mA to achieve a predetermined cycle-life. It will be appreciated by an artisan with skill in the art that the source voltage (Vco) and cutoff current for the smallest cell (Ico1) (or cell having the smallest capacity) can be chosen differently as may be dictated by the use behavior of the device 101 and a desired outcome sought by the designer.

In step 206 in FIG. 4, an optimal source current (Ico) can be determined from the product of the desired cutoff current (Ic1=50 mA) and a ratio of a total capacity of the cells 120 and 130 (1500 mAh) and a capacity of the smallest cell 120 (500 mAh). This calculation provides a source current (Ico) of 150 mA. For a simple parallel cell configuration as shown in FIG. 5, the cutoff current of the second cell 130 (Ic2) can be determined from the difference of the source current (Ico) and the cutoff current of the smallest cell 120 (Ic1). Thus, providing a cutoff current for the second cell 130 (Ic2) of 100 mA. For a structure having more than two parallel cells, the cutoff current of the second cell 130 (Ic2) can be determined from the product of the source current (Ico) and the ratio of the capacity of said cell 130 (1000 mAh) and the total capacity of the cells 120 and 130 (1500 mAh). A similar calculation can be applied to determine the cutoff currents for third, fourth, and up to $n^{th}$ parallel cells. Although 100 mA may be twice a desired cutoff current of the second cell 130, note that the second cell 130 is not fully charged yet. This is why the source current is applied solely to the second cell 130. It should also be noted that where parallel cells do not have asymmetric charge capacities such as shown in FIG. 5 (i.e., each cell has the same charge capacity), any cell could be selected in step 204 as the smallest cell of method 200. In other words, symmetric charge capacities among cells enable the selection of any of the cell in a battery as the smallest cell (the cell having the smallest capacity) for the purposes herein. In a similar embodiment as shown in FIG. 7, additional cells in parallel such as cell 140 can be included and additional switches such as switches 127 and 129 can be used to switch off or disconnect charging to a lower capacity cell such as using switch 127 to cut off current to cell 120 upon reaching an optimized current cutoff enabling continued charging to cells 130 and 140. Eventually, switch 129 can be switched off to enable continued charging to cell 140 only. Again, switches 127 and 129 can be switched back on to provide for full discharge capacity capability.

In a supplemental embodiment of the present invention, the device 101 can be embodied in a selective call radio (SCR) 100 having conventional technology comprising the device 101, a wireless transceiver 102 for communicating with a conventional radio communication system, a display 104 for conveying images to a user of the SCR 100, an audio system 106 for receiving and conveying audible signals to and from the user of the SCR, a memory 112 for storing and processing data, and a processor 114 coupled to the foregoing components 102-112 for control thereof. The charging system 108 of the device 101 operates under the control of the processor 114 and is programmed according to the aforementioned method 200 of FIG. 4.

In light of the foregoing description, it should be recognized that embodiments could be realized in hardware, software, or a combination of hardware and software. These embodiments could also be realized in numerous configurations contemplated to be within the scope and spirit of the claims below. It should also be understood that the claims are intended to cover the structures described herein as performing the recited function and not only structural equivalents.

What is claimed is:

1. A battery pack having a plurality of battery cells that works in conjunction with a charging system that supplies a source voltage and a source current and determines a capacity for each of the plurality of battery cells, a desired cutoff current for a select one of the plurality of battery cells having the smallest capacity, and an optimal source cutoff current according to the capacity of the select one of the plurality of battery cells, the battery pack comprising:
   the plurality of battery cells selectively coupled in parallel;
   at least one switch responsive to a control signal for selectively decoupling at least the select one of the plurality of battery cells and enabling at least one battery cell among the plurality of battery cells to continue charging; and
   wherein the plurality of battery cells receive an adjusted source current based on the optimal source cutoff current and the at least one switch is controlled to selectively decouple upon the source current reaching the optimal source cutoff current.

2. The battery pack of claim 1, wherein the at least one switch is further controlled to selectively couple to the select one among the plurality of battery cells upon another battery cell among the plurality battery cells becoming fully charged without having any of the plurality of battery cells exceeding their respective current cutoff thresholds.

3. The battery pack of claim 1, wherein the at least one switch comprises a field effect transistor.

4. The battery pack of claim 1, wherein the at least one switch is further controlled to open to enable at least one battery cell among the plurality of battery cells to continue charging until the at least one battery cell is fully charged.

5. The battery pack of claim 1, wherein the source voltage applied to the plurality of battery cells is selected to optimize both a cycle-life and a charge capacity of each of the plurality of battery cells.

6. In a charging system supplying a source voltage and a source current to a plurality of battery cells, a method comprising the steps of:
   determining a capacity for each of the plurality of battery cells;
   determining a desired cutoff current for a select one of the plurality of battery cells having the smallest capacity;
   determining an optimal source cutoff current according to the capacity of the select one of the plurality of battery cells;
   adjusting the source current according to the optimal source cutoff current; and
   upon the source current reaching the optimal source cutoff current, disconnecting at least the select one of the plurality of battery cells while continuing to apply the source current to a remaining set of cells among the plurality of battery cells.

7. The method of claim 6, wherein the plurality of battery cells correspond to a plurality of parallel battery cells.

8. The method of claim 7, wherein the optimal source cutoff current is the product of the desired cutoff current and a ratio of a total capacity of the plurality of parallel battery cells and a capacity of the select one of the plurality of parallel battery cells.

9. The method of claim 6, wherein the method continues to apply the source current to the remaining set of cells until the plurality of cells reach an optimal capacity while preserving an optimal cycle life.

10. The method of claim 6, wherein the step of determining the desired cutoff current further comprises the step of supplying from at least one of the plurality of battery cells one or more of a group of characteristics comprising one or more cutoff currents and corresponding expected cycle-life performance, and one or more source voltages and corresponding charge capacity.

11. The method of claim 6, wherein the determining step further comprises the step of determining a desired voltage from each of the plurality of battery cells for optimizing the cycle-life of the corresponding battery cell.

* * * * *